United States Patent [19]
Béchade et al.

[11] Patent Number: 4,766,565
[45] Date of Patent: Aug. 23, 1988

[54] ARITHMETIC LOGIC CIRCUIT HAVING A CARRY GENERATOR

[75] Inventors: Roland A. Béchade, South Burlington, Vt.; Martin S. Schmookler, Austin, Tex.

[73] Assignee: International Business Machines Corporation, Armonk, N.Y.

[21] Appl. No.: 930,177

[22] Filed: Nov. 14, 1986

[51] Int. Cl.⁴ .............................................. G06F 7/50
[52] U.S. Cl. ..................................... 364/784; 364/786
[58] Field of Search .............................. 364/784–788; 307/471–472

[56] References Cited

U.S. PATENT DOCUMENTS

| 3,125,675 | 3/1964 | Jeeves | 364/786 |
|---|---|---|---|
| 3,234,371 | 2/1966 | Osofsky | 364/786 |
| 3,234,373 | 2/1966 | Sellers, Jr. et al. | 364/784 |
| 3,249,746 | 3/1966 | Helbig et al. | 364/786 |
| 3,465,133 | 9/1969 | Booher | 364/786 |
| 4,031,379 | 6/1977 | Schwartz | 364/786 |
| 4,556,948 | 12/1985 | Mercy | 364/757 |
| 4,601,007 | 7/1986 | Uya | 364/784 |

FOREIGN PATENT DOCUMENTS

| 0155019 | 9/1985 | European Pat. Off. | 364/784 |
|---|---|---|---|
| 3025775 | 1/1982 | Fed. Rep. of Germany | 364/786 |

OTHER PUBLICATIONS

Beraud, "High–Speed Four–Bit Adder", IBM Technical Disclosure Bulletin, vol. 16, No. 12, May 1974, pp. 3950–3951.
Liu et al., "Optimal One–Bit Full Adders with Different Types of Gates", IEEE Trans. on Computers, vol. C-23, No. 1, Jan. 1974, pp. 63–70.
Bechade, "Selective Powering of Ripple ALU for Improved Power Performance" in IBM Technical Disclosure Bulletin, vol. 27, No. 6, Nov. 1984, pp. 3214–3215.
Bechade and Hoffman, "Programmable Arithmetic/Logic Circuit" in IBM Technical Disclosure Bulletin, vol. 23, No. 11, Apr. 1981, pp. 4870–4873.
Richards, "Arithmetic Operations in Digital Computers", New York, Van Nostrand (1955), p. 110.
Homan, "A Four-Megacycle, 24–Bit Checked Binary Adder", IBM Technical Report TR 00.737/CP 60-1327 given at Symposium on Switching Circuit Theory and Logical Design at AIEE Fall General Meeting, Oct. 10–14, 1960.

Primary Examiner—Gary V. Harkcom
Assistant Examiner—Tan V. Mai
Attorney, Agent, or Firm—Stephen J. Limanek

[57] ABSTRACT

An inverting full adder circuit for use in a ripple-carry adder or arithmetic logic unit (ALU) which includes a plurality of similar full adder stages connected in series such that the carry delay from one stage to the next is minimized, and which requires fewer devices and less space on the surface of a semiconductor chip than do known adders or ALUs of comparable performance. This invention may use either N-channel field effect transistors, i.e., NMOS technology, or it may use complementary metal oxide semiconductor (CMOS) technology.

15 Claims, 4 Drawing Sheets

ARITHMETIC LOGIC CIRCUIT HAVING A CARRY GENERATOR

DESCRIPTION

1. Technical Field

This invention relates to an arithmetic logic circuit and more particularly to a performance driven static ripple carry circuit.

2. Background

Arithmetic logic units (ALUs) such as full adders are well known in the computer industry, as disclosed, e.g., in IBM Technical Disclosure Bulletin article, "Selective Powering of Ripple ALU For Improved Power Performance" by R. A. Bechade, Vol. 27, No. 6, November 1984, pp. 3214–3215. In an article in IBM Technical Disclosure Bulletin entitled, "Programmable Arithmetic/Logic Circuit" by R. A. Bechade and W. K. Hoffman, Vol. 23, No. 11, April 1981, pp. 4870–4873, there is disclosed an inverting full adder made in N-channel transistor technology (NMOS). In U.S. Pat. No. 3,249,746, filed on Oct. 17, 1961, by W. A. Helbig et al, there is disclosed an adder which uses NAND circuits, U.S. Pat. No. 3,234,371, filed on Mar. 29, 1962, by H. Osofsky, there is disclosed an adder using AND, NOR and NOT circuits, U.S. Pat. No. 3,125,675, filed on Nov. 21, 1961, by T. A. Jeeves, there is disclosed a carry circuit for use in logic systems which employs NOR logic circuits exclusively and U.S. Pat. No. 3,465,133, filed on Jun. 7, 1966, by R. K. Booher, there is disclosed a carry system which uses both NAND and NOR circuits. A full adder which uses complementary metal oxide semiconductor (CMOS) field effect transistors is disclosed in U.S. Pat. No. 4,601,007.

Although the adders disclosed in the hereinabove identified references may provide satisfactory digital binary adders, the circuitry required to make these adders in integrated circuit form utilizes a relatively large amount of space on the surface of a semiconductor substrate or chip and with relatively slow operation.

DISCLOSURE OF THE INVENTION

It is an object of this invention to provide an inverting full adder circuit in either NMOS or CMOS technology for use in an adder or ALU which includes a plurality of similar inverting full adder stages connected in series such that the carry delay from one stage to the next is minimized and which requires fewer devices and less space on the surface of a semiconductor chip than do known adders or ALUs of comparable performance.

In accordance with the teachings of this invention, an arithmetic logic circuit such as a carry circuit or carry generator in a full adder, and more particularly, in an inverting full adder, includes a pull-up device and first, second and third pull-down devices, with the first and second pull-down devices connected serially to the pull-up device and the third pull-down device connected in parallel with the serially-connected first and second pull-down devices. A carry input terminal is provided at the first pull-down device, means such as a NAND circuit, is provided for generating an A OR B logic signal at the control electrode of the second pull-down device and means, such as a NOR circuit, is provided for generating a logic signal representative of A AND B signals at the control electrode of the third pull-down device. The input terminal of an inverter may be connected to the common point between the pull-up and pull-down devices. The arithmetic logic unit of this invention may use either N-channel field effect transistors, i.e., NMOS technology, or it may use CMOS technology. Furthermore, the carry circuit may advantageously be used in inverting full adders and thus also in high speed multipliers The foregoing and other objects, features and advantages of the invention will be apparent from the following and more particular description of the preferred embodiments of the invention, as illustrated in the accompanying drawings.

BEST MODE FOR CARRYING OUT THE INVENTION

Figure 1:
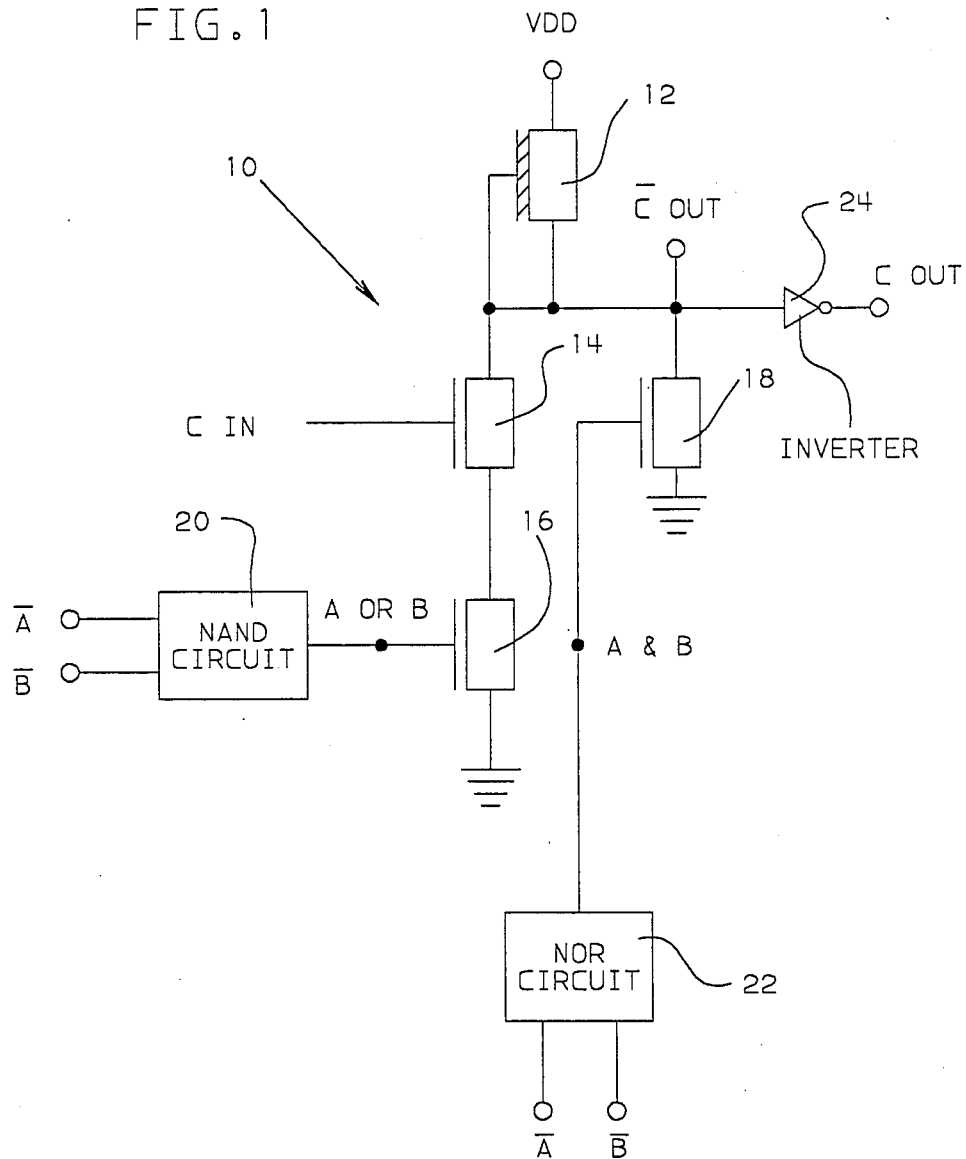
FIG. 1 illustrates, partly in block form, one embodiment of the carry generator of the present invention.

Referring to the drawings in more detail, there is illustrated in FIG. 1 an embodiment of the carry generator 10 of the present invention made in NMOS technology including a pull-up device 12, which may be a depletion-type field effect transistor connected to a voltage supply source VDD at, e.g., 3.3 or 5 volts, a first pull-down device 14, a second pull-down device 16 serially-connected with the first pull-down device 14 and a third pull-down device 18 connected in parallel with the serially-connected first and second devices 14 and 16. The transistors 12, 14 and 18 are connected at a common point to a terminal $\overline{C}$ OUT. The first, second and third pull-down devices 14, 16 and 18, may be enhancement-type field effect transistors. A carry signal input terminal C IN is connected to the control electrode of the transistor 14. A NAND circuit 20 has a first input connected to a first complemented polarity signal input terminal $\overline{A}$ and a second input connected to a second complemented polarity signal input terminal $\overline{B}$, with the output thereof connected to the control electrode of the transistor 16. A NOR circuit 22 also has a first input connected to the first complemented polarity signal input terminal $\overline{A}$ and a second input connected to the second complemented polarity signal input terminal $\overline{B}$. A small inverter 24 has an input connected to the terminal $\overline{C}$ OUT and an output connected to an output terminal C OUT. Any known NAND and NOR circuits may be used for the circuits 20 and 22, respectively, but preferably the NAND and NOR circuits disclosed in commonly as signed co-pending application having Ser. No. 930,176 filed on even date by R. A. Bechade et al, entitled, "Digital Binary Array Multiplier".

The characters $\overline{A}$ and $\overline{B}$ in the drawings indicate that complemented signals are present at each of these two terminals, the term C IN indicates that a true carry input signal is present at the terminal C IN, term $\overline{C}$ OUT indicates that a complemented carry output signal is present at the terminal $\overline{C}$ OUT and the term C OUT indicates that a true carry output signal is present at the terminal C OUT. The signals applied to the terminals $\overline{A}$ and $\overline{B}$ which represent binary numbers to be added may be obtained from any suitable source, such as a register. If latches are used as the source of the binary numbers, the true signal may be obtained from one side of a latch and the complemented signal taken from the other side of the latch, as is well known.

In the operation of the carry generator illustrated in FIG. 1 of the drawings, a first complemented polarity signal representative of a first binary digit is applied to the input terminal $\overline{A}$ of the NAND circuit 20 and of the NOR circuit 22 and a second complemented polarity signal representative of a second binary digit which is to be added to the first binary digit is applied to the input terminal $\overline{B}$ of the NAND circuit 20 and of the NOR circuit 22. As is known, the output of the NAND circuit 20 provides a true polarity output signal A OR B which is applied to the control electrode of the transistor 16 and the output of the NOR circuit 22 provides a true polarity output signal representative of signals A AND B which is applied to the control electrode of the transistor 18. A true polarity input carry signal representative of the carry signal from a previous stage of, e.g., an inverting full adder (not shown), is applied to the control electrode C IN of the transistor 14. At the simultaneous application of these signals at terminals $\overline{A}$, $\overline{B}$ and C IN, a complemented polarity output carry signal is produced at terminal $\overline{C}$ OUT, which may be applied to a subsequent stage of, e.g., a full adder (not shown).

It can be readily seen that in the carry circuit of the present invention which uses only three N-channel transistors shown in FIG. 1 of the drawings, there is only one stage of delay between the input carry signal terminal C IN and the output carry signal terminal $\overline{C}$ OUT, i.e., the input carry signal is applied to the control electrode of the transistor 14 and the output carry signal is produced at the drain terminal of the transistor 14. Furthermore, if desired, a true polarity output carry signal may be obtained at the output of the inverter 24 at output terminal C OUT.

Although complemented polarity signals have been applied to terminals $\overline{A}$ and $\overline{B}$ of NAND and NOR circuits 20 and 22, respectively, and a true polarity input carry signal has been applied to the control electrode C IN of the transistor 14 to obtain a complemented polarity output carry signal at terminal $\overline{C}$ OUT, it should be understood that the carry circuit or generator 10 may be used in an alternate stage of an adder, as will be described hereinbelow, by simply applying true polarity signals A and B to the inputs of the NAND and NOR circuits 20 and 22, respectively, and a complemented polarity input carry signal $\overline{C}$ IN to the control electrode of the transistor 14 to obtain a true polarity output carry signal C OUT at the input of the inverter 24 15 and a complemented polarity output carry signal $\overline{C}$ OUT at the output of the inverter 24.

Figure 2:
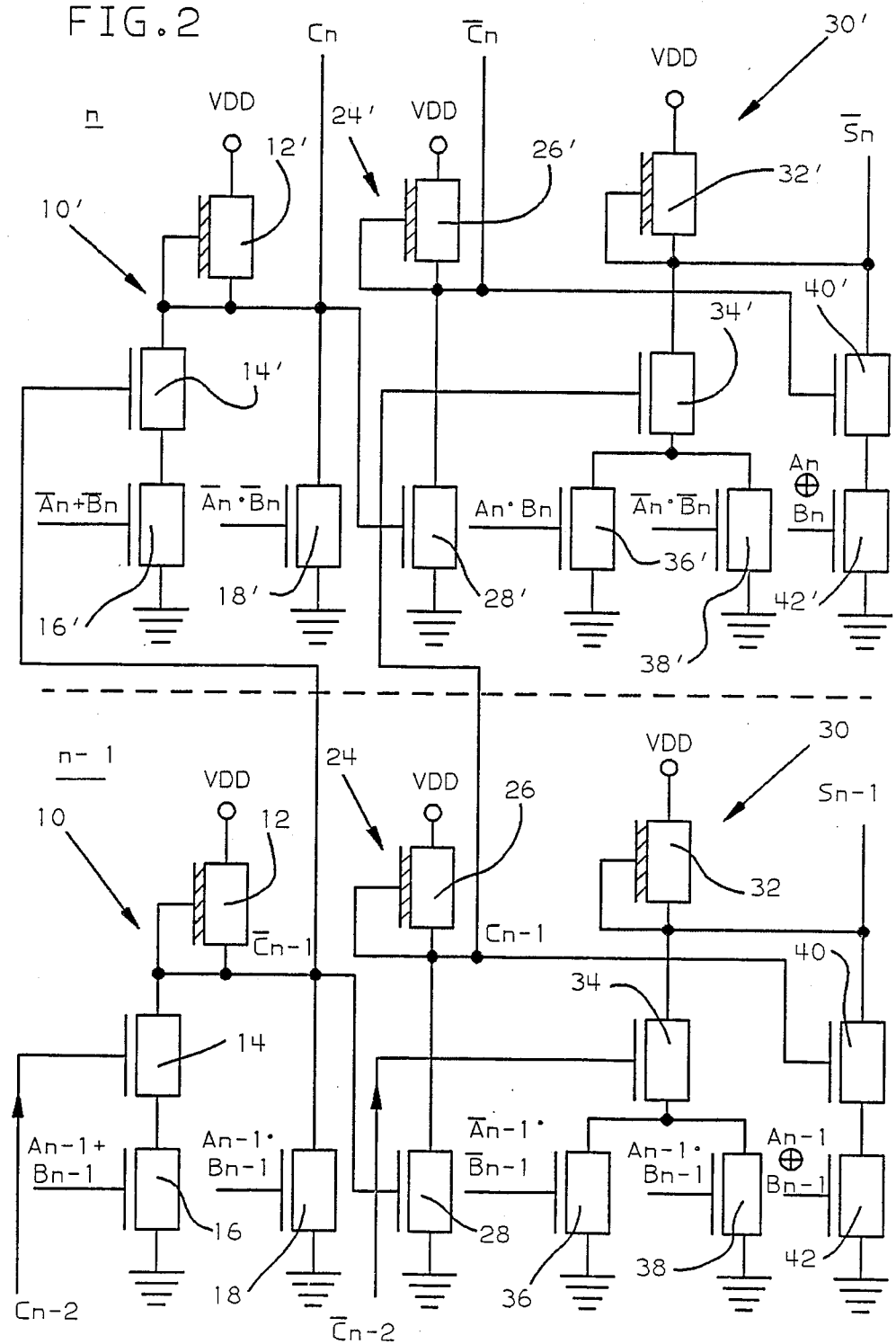
FIG. 2 is a circuit diagram of an inverting full adder of the present invention in NMOS technology.

FIG. 2 of the drawings shows a circuit diagram of an inverting full adder of the present invention in NMOS technology which utilizes the carry circuit or generator disclosed in FIG. 1 of the drawings. This adder may be used to add a first adder word $A_n$, $A_{n-1}$, $A_{n-2}$ to a second adder word $B_n$, $B_{n-1}$, $B_{n-2}$ in binary digit form. As shown in FIG. 2, wherein elements similar to those of FIG. 1 have like numbers, a given stage $n-1$ of the inverting full adder includes the carry circuit 10 of FIG. 1 which has the pull-up transistor 12 and the pull-down transistors 14, 16 and 18. A true polarity signal $A_{n-1}$ OR $B_{n-1}$, which may be received from the output of NAND circuit 20 of FIG. 1, is applied to the transistor 16 and the true polarity signal representative of $A_{n-1}$ AND $B_{n-1}$, which may be received from the output of NOR circuit 22 of FIG. 1, is applied to the transistor 18, with a true polarity input carry signal $C_{n-2}$ from a previous stage $n-2$ (not shown) being applied to the transistor 14 to provide a complemented polarity output carry signal at terminal $\overline{C}_{n-1}$. The inverter 24, acting as a buffer circuit which includes a pull-up field effect transistor 26 connected as a diode and a pull-down field effect transistor 28, has the carry output terminal $\overline{C}_{n-1}$ connected to the control electrode of the transistor 28. The output of the inverter 24 at terminal $C_{n-1}$ is connected to a sum generator 30 which has a depletion-type pull-up field effect transistor 32 connected as a diode between a voltage source VDD and an output terminal $S_{n-1}$ and first, second, third, fourth and fifth pull-down field effect transistors 34, 36, 38, 40 and 42, respectively. The first and second transistors 34 and 36 are serially connected between the output terminal $S_{n-1}$ and a point of reference potential such as ground and the third transistor 38 is connected in parallel with the second transistor 36 between ground and a common point between transistors 34 and 36. The fourth and fifth transistors 40 and 42 are serially connected between the output terminal $S_{n-1}$ and ground. A complemented polarity input carry signal $\overline{C}_{n-2}$ which may be derived from the input carry signal $C_{n-2}$ after passing through an inverter such as inverter 24 is applied to the control electrode of transistor 34, a signal representative of $\overline{A}_{n-1}$ AND $\overline{B}_{n-1}$, which may be derived from the signal $A_{n-1}$ OR $B_{n-1}$ after passing through an inverter (not shown) is applied to the control electrode of the transistor 36 and the signal $A_{n-1}$ AND $B_{n-1}$ is applied to the control electrode of the transistor 38. The output terminal $C_{n-1}$ of the inverter 24 is connected to the control electrode of the fourth transistor 40 and the control electrode of the transistor 42 has a signal applied thereto representative of an exclusive OR of true polarity signal $A_{n-1}$ and true polarity signal $B_{n-1}$, which may be derived from any known exclusive OR circuit (not shown).

The output carry signals at terminal $\overline{C}_{n-1}$ and at terminal $C_{n-1}$ are applied to a subsequent adder stage n. The circuit of stage n of the full adder is similar to that of stage $n-1$. As can be seen in FIG. 2 of the drawings, stage n of the inverting full adder includes a carry circuit 10' having pull-up transistor 12' and pull-down transistors 14', 16' and 18', an inverter 24' having transistors 26' and 28' and a sum generator 30' having pull-up transistor 32' and pull-down transistors 34', 36', 38', 40' and 42'.

A signal $\overline{A}_n$ OR $\overline{B}_n$, which may be received from the output of a NAND circuit similar to that of NAND circuit 20 of FIG. 1 having true input signals A and B, is applied to the transistor 16' and the signal representative of $\overline{A}_n$ AND $\overline{B}_n$, which may be received from the output of a NOR circuit similar to that of NOR circuit 22 of FIG. 1 having true input signals A and B is applied to the transistor 18', with the complemented polarity input carry signal from stage $n-1$ being applied to the transistor 14' to provide a true polarity output carry signal at terminal $C_n$. The inverter 24' has the carry output terminal $C_n$ connected to the control electrode of the transistor 28'. The output of the inverter 24' at terminal $\overline{C}_n$ is connected to the control electrode of transistor 40' of the sum generator 30'. The true polarity carry signal $C_{n-1}$ from the output of the inverter 24 of stage $n-1$ is applied to the control electrode of the transistor 34'. A signal representative of $A_n$ AND $B_n$, which may be derived from the signal $\overline{A}_n$ OR $\overline{B}$ after passing through an inverter (not shown) is applied to the control electrode of the transistor 36' and the signal $\overline{A}n$ AND $\overline{B}n$ is applied to the control electrode of the transistor 38'. Applied to the control electrode of the transistor 42' is a signal representative of an exclusive OR of true polarity signal An and true polarity signal Bn, which may be derived from any known exclusive OR circuit (not shown).

In the operation of the inverting full adder illustrated in FIG. 2 of the drawings, it can be seen that carry signals $Cn-2$ and $\overline{C}n-2$ from a previous stage $n-2$ are applied to the carry generator 10 and the sum generator 30, respectively, along with appropriately processed signals $An-1$ and $Bn-1$ applied to the transistors 16, 18, 36, 38 and 42, to produce a complemented polarity carry signal at the terminal $\overline{C}n-1$ and a true polarity sum signal $Sn-1$ at the output terminal $Sn-1$, with a true polarity carry signal being derived at the output terminal $Cn-1$ of the inverter 24. The carry signals $\overline{C}n-1$ and $Cn-1$ from stage $n-1$ are applied to the carry generator 10' and the sum generator 30', respectively, along with appropriately processed signals An and Bn applied to the transistors 16', 18', 36', 38' and 42', to produce a true polarity carry signal at the terminal Cn and a complemented polarity sum signal $\overline{S}n$ at the output terminal $\overline{S}n$, with a complemented polarity carry signal being derived at the output terminal $\overline{C}n$ of the inverter 24'. It is, of course, to be understood that the terminal $\overline{S}n$ provides a more significant binary digit number in the addend than that provided at the terminal $Sn-1$. It should also be understood that a true polarity sum signal Sn may be provided by simply connecting the input of an inverter (not shown) to the terminal $\overline{S}n$ of the sum generator 30'. It furthermore can be readily seen that the carry signals Cn and $\overline{C}n$ may be applied to subsequent stages, such as a stage $n+1$ (not shown), of the inverting full adder of the present invention depending upon the number of binary digits that are found in the adder words to be added.

It should be noted that the carry circuit of the full adder of this invention operates at higher speeds than do known adders of equivalent technology, since the carry circuit has very few devices to contribute internal capacitance, has only one stage of delay, and the full adder is designed to minimize additional capacitive load, e.g., the carry terminal $\overline{C}n-1$ of stage $n-1$ is connected to only the control electrode of the transistor 28 of the small inverter 24 and the control electrode of the transistor 14' of the carry generator 10' of stage n, which form a very small capacitive load. Furthermore, only one phase of the input signal A and B, i.e., a true polarity or a complemented polarity signal is required at each binary digit position or stage, such as stage $n-1$. Also, it can be seen that the inputs A and B are inverted at every other stage.

Figure 3:
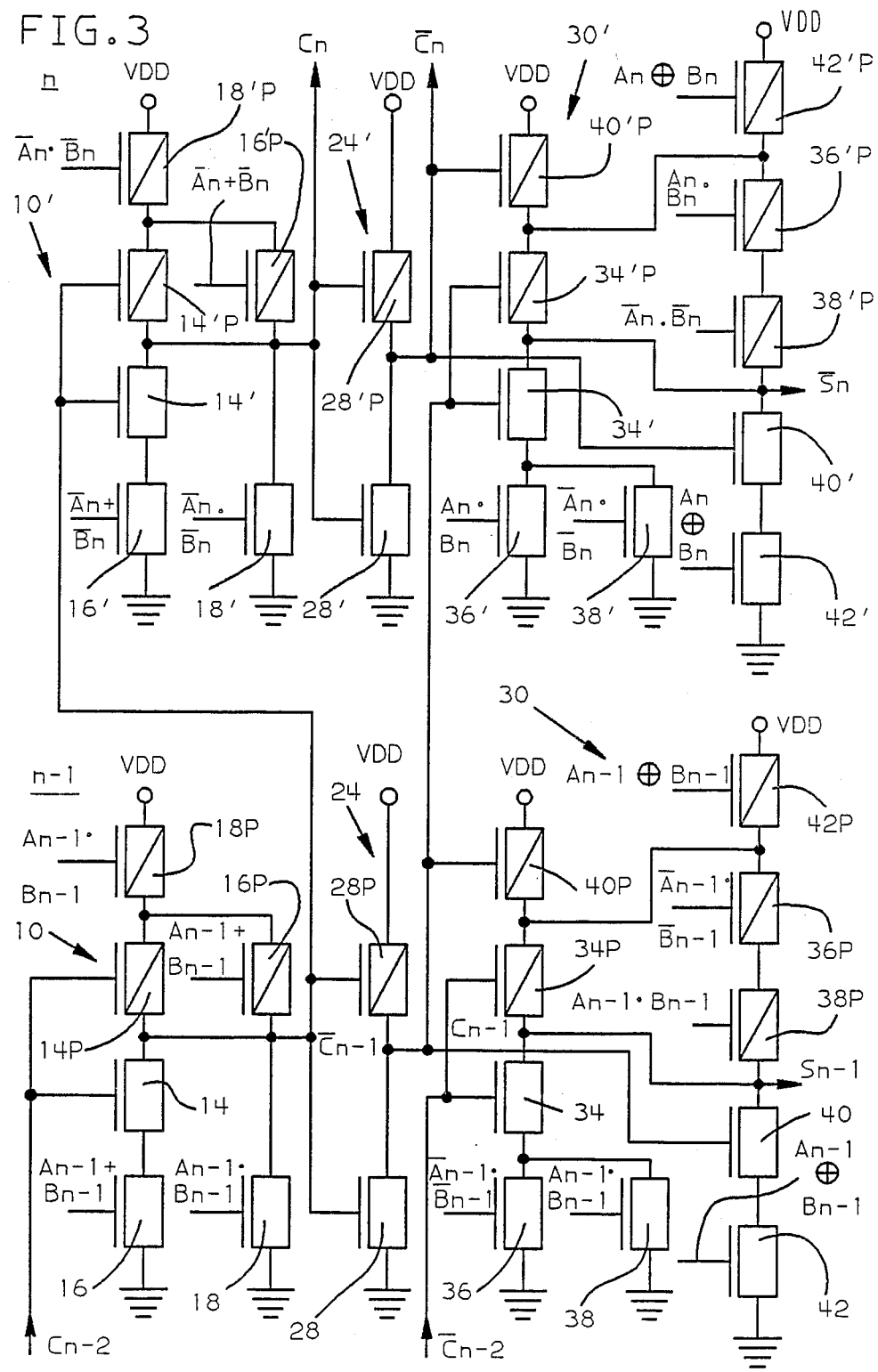
FIG. 3 is a circuit diagram of an inverting full adder of the present invention in CMOS technology.

The inverting full adder of FIG. 3 of the drawings is similar in structure and in operation to the full adder shown in FIG. 2 except that the adder of FIG. 3 is made in the CMOS technology. Accordingly, the pull-up devices in the inverting full adder of FIG. 3 are P-channel field effect transistors while the pull-down devices remain as N-channel field effect transistors. The pull-up transistors that are commonly connected at their inputs to the pull-down transistors have similar numbers except that the numbers are followed by a P. Thus, in the carry generator 10 of stage $n-1$, the pull-down N-channel transistor 16 has its control electrode connected to the control electrode of the P-channel transistor 16P and the N-channel transistor 14 and the P-channel transistor 14P have their control electrodes connected in common to the true polarity input carry terminal $Cn-2$. It should be noted that the CMOS inverting full adder of FIG. 3 operates at a higher speed than does the adder of FIG. 2 and it also has the advantage of lower power dissipation over the adder of FIG. 2.

Figure 4:
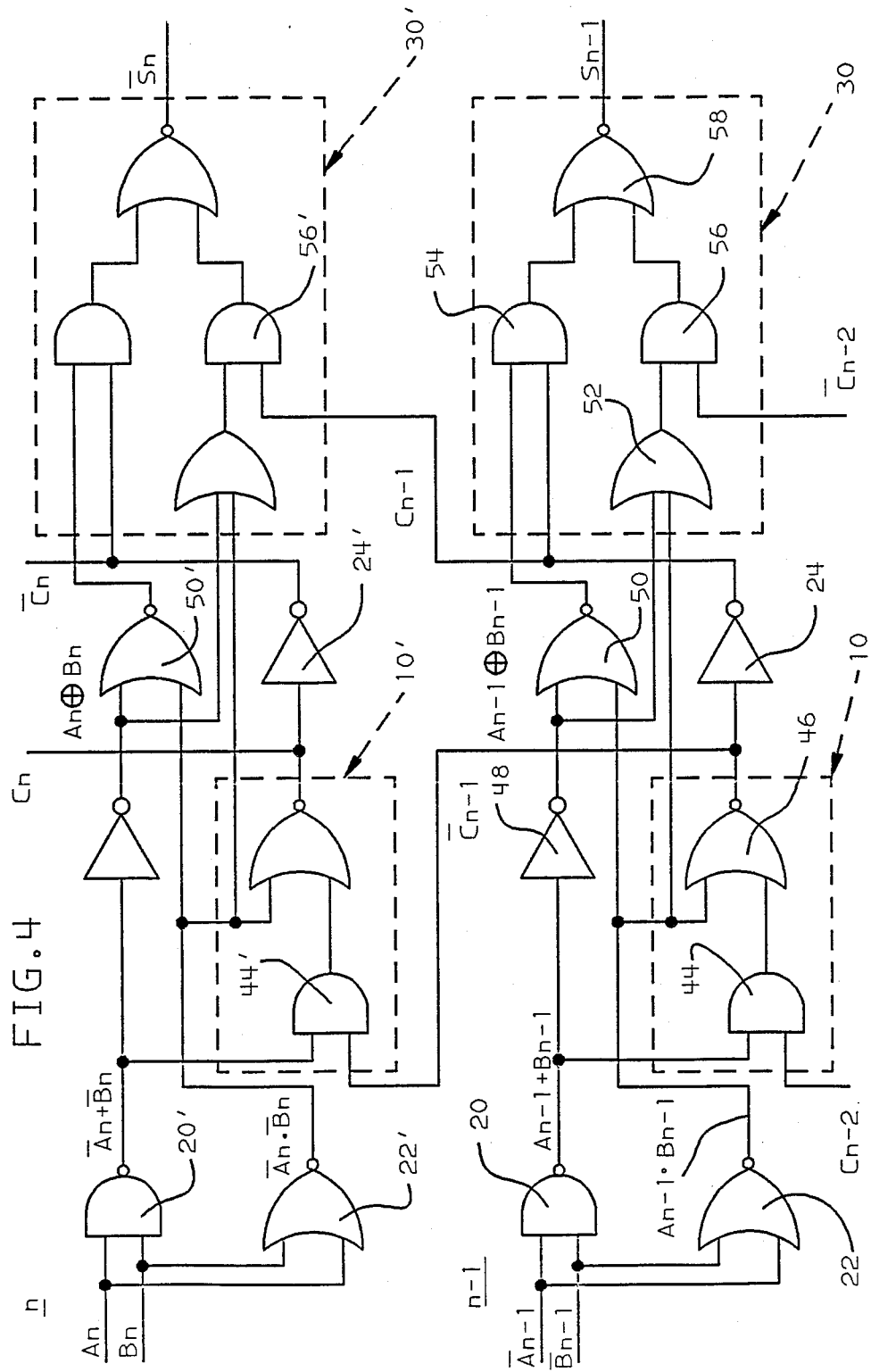
FIG. 4 illustrates in schematic logic form the arithmetic logic unit of the present invention.

FIG. 4 of the drawings illustrates in schematic logic form the inverting full adders shown in FIGS. 2 and 3. As can be seen in FIG. 4 at stage $n-1$, signals $\overline{A}n-1$ and $\overline{B}n-1$ are applied to the inputs of the NAND and NOR circuits 20 and 22 as indicated in FIG. 1 of the drawings. The output of the NAND circuit 20 is applied to an AND circuit 44 of the carry generator 10 along with the carry signal $Cn-2$ from the previous stage $n-2$ (not shown). The output of the NOR circuit 22 along with the output of the AND circuit 44 are applied to the input of a NOR circuit 46 of the carry generator 10. The output of the NAND circuit 20 after passing through an inverter 48 is applied to a first input of a NOR circuit 50 and the output of the NOR circuit 22 is applied directly to a second input of the NOR circuit 50. The NOR circuit 50 forms an exclusive OR function since the inputs to the NOR circuit 50 are derived from the output of the NOR circuit 22 and the inverted output of the NAND circuit 20. The output of the NOR circuit 22 and the output of the inverter 48 are connected to an OR circuit 52 of the sum generator 30. The output of the NOR circuit 46 after passing through the inverter 24 is applied to a first input of a first AND circuit 54 and the output of the exclusive OR function, i.e., NOR circuit 50, is applied directly to a second input of the first AND circuit 54 of the sum generator 30. The output of the OR circuit 52 is connected to a first input of a second AND circuit 56 of the sum generator 30 with a second input of the second AND circuit 56 having the carry signal $\overline{C}n-2$ applied thereto. The outputs from the first and second AND circuits 54 and 56 of the sum generator 30 are applied to the inputs of a NOR circuit 58, at the output of which is the output terminal $Sn-1$.

Comparing the $n-1$ stage of the inverting full adder of FIG. 2 with the schematic logic form of the $n-1$ stage inverting full adder of the present invention shown in FIG. 4, it can be seen that the AND circuit 44 includes transistors 14 and 16 of FIG. 2 and the NOR circuit 46 includes the transistors 14, 16, 18 and 12. Also, in the sum generator 30, the OR circuit 52 includes transistors 36 and 38, the first AND circuit 54 includes transistors 40 and 42, the second AND circuit 56 includes transistors 36, 38 and 34 and the NOR circuit 58 includes transistors 34, 36, 38, 40, 42 and 32. The inverter 48 and the NOR circuit 50 of the $n-1$ stage of the full adder of FIG. 4 are not shown in the full adder of FIG. 2.

It can be seen that the subsequent stage n of the full adder of FIG. 4 is similar to the $n-1$ stage with the carry signal $\overline{C}n-1$ applied to an input of AND circuit 44' of the carry gnerator 10' and the carry signal $Cn-1$ applied to an input of AND circuit 56' of the sum generator 30' while signals An and Bn are applied to the inputs of the NAND and NOR circuits 20' and 22', as indicated in FIG. 4, to provide at the output of stage n the signal $\overline{S}n$.

Accordingly, it can be seen from the teachings of this invention that the sum generator requires only an inverted output from the carry generator of the previous stage and from the carry generator of its own stage, and it does not use directly the output of any carry generator, which minimizes the load on the carry generators.

A NAND circuit and a NOR circuit at the input of every stage combines the A and B signals from the adder words to drive the carry generator. All of the stages operate in parallel so that only one logic delay is provided in the critical path of each stage n−1, n, n+1, etc. The delay through the NOR circuit 50 or 50' of stages n−1 and n, respectively, is not critical because these circuits are located in parallel with the carry generator 10 or 10'. The signals from the sum generator 30 or 30', the NOR circuit 50 or 50' and the inverter circuit 48 can be selected to generate all necessary logic and arithmetic functions for the ALU.

It can be readily seen that an arithmetic logic circuit has been described in accordance with the teachings of this invention which requires less surface on a semiconductor substrate or chip than do known arithmetic logic circuits of comparable performance. The ALU of the present invention is faster than known ripple carry ALUs and comparable in performance to the more complex carry-lookahead designs.

While the invention has been particularly shown and described with reference to preferred embodiments thereof, it will be understood by those skilled in the art that various changes in form and details may be made therein without departing from the spirit and scope of the invention.

What is claimed is:

1. An arithmetic logic circuit comprising
a first carry generator, said carry generator including pull-up means disposed between a voltage supply source and an output terminal,
first, second and third switching devices, said first and second switching devices being serially connected between said output terminal and a point of reference potential and said third switching device being connected between said output terminal and said point of reference potential,
first means for applying a true carry signal to a control element of said first switching device,
second means including a NAND circuit for generating a first signal coupled to a control element of said second switching device,
third means including a NOR circuit for generating a second signal coupled to a control element of said third switching device, and
means for applying a first logic signal of complemented polarity to a first input of said NAND and said NOR circuits and for applying a second signal of complemented polarity to a second input of said NAND and said NOR circuits.

2. An arithmetic logic circuit as set forth in claim 1 wherein said first, second and third switching devices include first, second and third N-channel field effect transistors, respectively, and said pull-up means includes P-channel field effect transistors.

3. An arithmetic logic circuit as set forth in claim 2 wherein said pull-up means includes first, second and third P-channel field effect transistors, said second and first P-channel field effect transistors being serially connected between said voltage supply source and said output terminal and said third P-channel field effect transistor being connected from a common point between said first and second P-channel field effect transistors to said output terminal, a control element of said first P-channel field effect transistor being connected to the control element of the first switching device, a control element of said second P-channel field effect transistor being connected to the control element of said third switching device and a control element of said third P-channel field effect transistor being connected to the control element of said second switching device.

4. An arithmetic logic circuit as set forth in claim 3 further including an inverter having a fourth P-channel field effect transistor serially connected with a fourth N-channel field effect transistor connected between said voltage supply source and said point of reference potential, said output terminal being connected to control electrodes of said fourth P-channel and N-channel field effect transistors.

5. An arithmetic logic circuit as set forth in claim 4 further including a sum generator having an input connected to a common point between said fourth P-channel and N-channel field effect transistors.

6. An arithmetic logic circuit as set forth in claim 5 further including a second carry generator and a second sum generator, an input of said second carry generator being connected to said output terminal and an input of said second sum generator being connected to the common point between said fourth P-channel and N-channel field effect transistors.

7. An arithmetic logic circuit as set forth in claim 6 wherein said second carry generator includes fifth, sixth and seventh N-channel field effect transistors, said fifth and sixth N-channel field effect transistors being serially connected between a second output terminal and said point of reference potential, said seventh N-channel field effect transistor being connected between said second output terminal and said point of reference potential and a control electrode of said fifth N-channel field effect transistor being connected to the control electrodes of said fourth P-channel and N-channel field effect transistors.

8. An arithmetic logic circuit as set forth in claim 7 further including a second NAND circuit connected to a control electrode of said sixth N-channel field effect transistor and a second NOR circuit connected to a control electrode of said seventh N-channel field effect transistor.

9. An arithmetic logic circuit comprising
a first carry generator, said first carry generator including
a voltage supply source,
a output terminal,
pull-up means disposed between said voltage supply source and said output terminal,
first, second and third transistors, said first and second transistors being serially connected between said output terminal and a point of reference potential and said third transistor being connected between said output terminal and said point of reference potential,
menas for applying a true carry signal to a control electrode of said first transistor,
a NAND circuit having first and second inputs and an output connected to a control electrode of said second transistor,
A NOR circuit having first and second inputs and an output connected to a control electrode of said third transistor, and
means for applying a first logic signal of complemented polarity to said first inputs of said NAND and NOR circuits and for applying a second logic signal of complemented polarity to said second inputs of said NAND and NOR circuits.

10. An arithmetic logic circuit as set forth in claim 9 wherein each of said first, second and third transistors is an N-channel field effect transistor and wherein said pull-up means includes first, second and third P-channel field effect transistors, said second and first P-channel field effect transistors being serially connected between said voltage supply source and said output terminal, said third P-channel field effect transistor being connected from a common point between said first and second field effect transistors to said output terminal, a control electrode of said first P-channel field effect transistor being connected to the control electrode of said first N-channel field effect transistor, a control electrode of said second P-channel field effect transistor being connected to the control electrode of said third N-channel field effect transistor and a control electrode of said third P-channel field effect transistor being connected to the control electrode of said second N-channel field effect transistor.

11. An arithmetic logic circuit as set forth in claim 9 further including an inverter and a sum generator, said inverter having an input connected to said output terminal and an output connected to an input of said sum generator.

12. An arithmetic logic circuit as set forth in claim 11 further including a second carry generator and a second sum generator, an input of said second carry generator being connected to said output terminal and an input of said second sum generator being connected to the output of said inverter.

13. A carry generator comprising
 a NAND circuit,
 a first NOR circuit,
 an AND circuit having a first input connected to the output of said NAND circuit and a second input to which is applied a carry signal of a true polarity,
 a second NOR circuit having a first input connected to the output of said first AND circuit and a second input connected to the output of said first NOR circuit, and
 means for applying a first logic signal of complemented polarity to a first input of said NAND and said first NOR circuits and for applying a second logic signal of complemented polarity to a second input of said NAND and said first NOR circuits.

14. A full adder comprising
 a first stage and a second stage, each of said stages having an inverting full adder which includes
 a NAND circuit,
 a first NOR circuit,
 a first AND circuit having a first input connected to the output of said NAND circuit and a second input,
 a second NOR circuit having a first input connected to the output of said first AND circuit and a second input connected to the output of said first NOR circuit,
 first and second inverters, said first inverter having an input connected to the output of said NAND circuit and said second inverter having an input connected to the output of said second NOR circuit,
 a third NOR circuit having a first input connected to the output of said first inverter and a second input connected to the output of said first NOR circuit,
 an OR circuit having a first input connected to the output of said first NOR circuit and a second input connected to the output of said first inverter,
 a second AND circuit having a first input connected to the output of said third NOR circuit and a second input connected to the output of said second inverter,
 a third AND circuit having a first input connected to the output of said OR circuit and a second input, and
 a fourth NOR circuit having a first input connected to the output of said second AND circuit and a second input connected to the output of said third AND circuit,
 means for connecting the output of said second NOR circuit of said first stage to the second input of said first AND circuit of said second stage,
 means for connecting the output of said second inverter of said first stage to the second input of said third AND circuit of said second stage,
 means for applying a carry signal of a true polarity to the second input of said first AND circuit of said first stage,
 means for applying said carry signal of a complemented polarity to the second input of said third AND circuit of said first stage,
 means for applying a first logic signal of complemented polarity to a first input of said NAND and said first NOR circuits and for applying a second logic signal of complemented polarity to a second input of said NAND and said first NOR circuits of said first stage, and
 means for applying a third logic signal of true polarity to a first input of said NAND and said first NOR circuits and for applying a fourth logic signal of true polarity to a second input of said NAND and said first NOR circuits of said second stage.

15. An adder comprising
 a first stage and a second stage, each of said stages having an inverting full adder which comprises
 a carry generator including
 a NAND circuit,
 a first NOR circuit,
 an AND circuit having a first input connected to the output of said NAND circuit and a second input, and
 a second NOR circuit having a first input connected to the output of said AND circuit and a second input connected to the output of said first NOR circuit,
 an inverter having an input connected to the output of said second NOR circuit, and
 a sum generator coupled to the output of said inverter,
 means for connecting the output of said second NOR circuit of said first stage to the second input of said AND circuit of said second stage,
 means for connecting the output of said inverter of said first stage to an input of said sum generator of said second stage,
 means for applying a carry signal of a true polarity to the second input of said AND circuit of said first stage,
 means for applying said carry signal of a complemented polarity to an input of said sum generator of said first stage,
 means for applying a first logic signal of complemented polarity to a first input of said NAND and said first NOR circuits and for applying a second logic signal of complemented polarity to a second input of said NAND and said first NOR circuits of said first stage, and
 means for applying a third logic signal of true polarity to a first input of said NAND and said first NOR circuits and for applying a fourth logic signal of true polarity to a second input of said NAND and said first NOR circuits of said second stage.

* * * * *